United States Patent
Jung et al.

(10) Patent No.: US 10,920,089 B2
(45) Date of Patent: Feb. 16, 2021

(54) AQUEOUS PAINT COMPOSITION FOR VEHICLE PRIMER COATING AND VEHICLE COATING METHOD USING SAME

(71) Applicant: KCC CORPORATION, Seoul (KR)

(72) Inventors: Bong Ki Jung, Busan (KR); Myoung Gi Choi, Gyeonggi-do (KR)

(73) Assignee: KCC Corporation, Seoul (KR)

( * ) Notice: Subject to any disclaimer, the term of this patent is extended or adjusted under 35 U.S.C. 154(b) by 66 days.

(21) Appl. No.: 16/073,377

(22) PCT Filed: Jan. 26, 2017

(86) PCT No.: PCT/KR2017/000964
§ 371 (c)(1),
(2) Date: Jul. 27, 2018

(87) PCT Pub. No.: WO2017/131472
PCT Pub. Date: Aug. 3, 2017

(65) Prior Publication Data
US 2019/0031888 A1    Jan. 31, 2019

(30) Foreign Application Priority Data

Jan. 29, 2016    (KR) .................. 10-2016-0011697

(51) Int. Cl.
| | | |
|---|---|---|
| C09D 5/00 | (2006.01) | |
| C09D 167/00 | (2006.01) | |
| C09D 175/04 | (2006.01) | |
| B05D 3/02 | (2006.01) | |
| C09D 133/06 | (2006.01) | |
| B05D 7/14 | (2006.01) | |
| C09D 5/02 | (2006.01) | |

(52) U.S. Cl.
CPC .............. *C09D 5/002* (2013.01); *B05D 3/02* (2013.01); *B05D 7/14* (2013.01); *C09D 5/022* (2013.01); *C09D 133/06* (2013.01); *C09D 167/00* (2013.01); *C09D 175/04* (2013.01)

(58) Field of Classification Search
CPC ...... C09D 5/002; C09D 5/022; C09D 133/06; C09D 175/04; C09D 167/00; B05D 7/14; B05D 3/02
See application file for complete search history.

(56) References Cited

U.S. PATENT DOCUMENTS

| | | | | |
|---|---|---|---|---|
| 5,419,487 A | * | 5/1995 | Nielsen | C09D 5/021 |
| | | | | 239/10 |
| 2004/0014882 A1 | | 1/2004 | Feola et al. | |
| 2005/0014885 A1 | | 1/2005 | Katsuta et al. | |
| 2010/0291379 A1 | * | 11/2010 | Jo | C09D 7/63 |
| | | | | 428/336 |
| 2011/0256320 A1 | | 10/2011 | Gebregiorgis et al. | |
| 2015/0004401 A1 | | 1/2015 | Kojima et al. | |

FOREIGN PATENT DOCUMENTS

| | | | |
|---|---|---|---|
| CN | 105121037 A | | 12/2015 |
| JP | 2004068010 A | | 3/2004 |
| JP | 2005-023303 A | | 1/2005 |
| JP | 2006-265310 A | | 10/2006 |
| JP | 2006265310 A | * | 10/2006 |
| JP | 2006321863 A | | 11/2006 |
| JP | 2013060577 A | | 4/2013 |
| JP | 2013213151 A | | 10/2013 |
| KR | 10-0484060 B | | 4/2005 |
| KR | 10-0665882 B | | 1/2007 |
| KR | 20130078554 A | | 7/2013 |
| KR | 1020110147566 A | * | 7/2013 |
| WO | 2010078355 A2 | | 7/2010 |
| WO | 2014-169996 A1 | | 10/2014 |
| WO | WO-2014-169996 A1 | * | 10/2014 |

OTHER PUBLICATIONS

JP2018-538739 Office Action dated Aug. 5, 2019; 4 pgs.
EP17744593.9 Extended European Search Report dated Jan. 8, 2019; 6 pgs.
PCT/KR2017/000964 International Search Report dated May 4, 2017; 2 pgs.
CN201780008761.3 Office Action dated Oct. 24, 2019, 6 pgs.

\* cited by examiner

*Primary Examiner* — William P Fletcher, III
(74) *Attorney, Agent, or Firm* — Morgan, Lewis &. Bockius LLP

(57) ABSTRACT

Embodiments relate to an aqueous paint composition for vehicle primer coating and a method for coating a vehicle by using the same, where the composition includes, on the basis of the weight of the entire paint composition, 20 to 50 wt % polyester resin, 1 to 20 wt % acrylic resin, 1 to 15 wt % water-dispersed urethane resin, 1 to 15 wt % urethane resin; and 10 to 30 wt % melamine curing agent.

17 Claims, No Drawings

AQUEOUS PAINT COMPOSITION FOR VEHICLE PRIMER COATING AND VEHICLE COATING METHOD USING SAME

CROSS-REFERENCE TO RELATED APPLICATIONS

This application claims the benefit of and priority to PCT/KR2017/000964, filed on Jan. 26, 2017, entitled (translation), "AQUEOUS PAINT COMPOSITION FOR VEHICLE PRIMER COATING AND VEHICLE COATING METHOD USING SAME," which claims the benefit of and priority to Korean Patent Application No. 10-2016-0011697, filed on Jan. 29, 2016, each of which is incorporated by reference in its entirety into this application.

BACKGROUND

Field

Embodiments relate to an aqueous paint composition for primer coating of vehicle and a coating method using the same.

Description of the Related Art

Due to high industrialization, human beings are provided with practical life in comfortable circumstances. In modern society, as per the importance of the appearance together with the technical growth of vehicles which are topped one of the best inventions, have been suggested from the eighties, technical approaches accommodating these issues have been conducted. However, in recent years, the importance of the global environmental preservation is rapidly emphasized and development on techniques for establishing countermeasures is being conducted in each industrial world. Recently, developed countries such as Europe actively limit the use of volatile organic compounds (VOC), and impose sanctions on products using thereof. Commonly known volatile organic compounds are easily volatilized at room temperature, and if they are present in a gas phase, they spontaneously diffuse in the air and become an important factor of air pollution. Since the volatile organic compound embeds inherent biological toxicity and chemical reactivity, various types of environmental problems are known to be induced, and serious environmental destruction including the creation of an ozone layer, the destruction of an ozone layer in the stratosphere, the generation of greenhouse effect, and the generation of offensive odor, is generated.

Recently, a new law regulating such volatile organic compounds is being made, and as an example, the United States limit the amount used of an organic solvent to 230 g/l or less (recommended value of 228 g/l) per volume for electrodeposited coating in paint and painting fields, and EU limits the amount used of an organic solvent to 30 g/m$^2$ or less per painting area of a vehicle(automobile) body, and the United Kingdom limits thereof to 50 g/m$^2$ or less.

In Korea, there is no regulation limiting the amount used of an organic solvent, but about 40% or more of the total exhausting amount is originated from painting facilities and storage facilities. Thus, the government regulates the kind of volatile organic compounds, the kind and scale of exhausting facilities, the establishment of prevention facilities and the control standards thereof based on Clean Air Conservation Act 28, Article 2.

The vehicle paint has great riffle effect on international economy and market in addition to the important proposition of completing appearance and protecting environment, and basically requires economic feasibility and quality improvement. For this purpose, the amounts used of solvents and harmful heavy metals for a paint are required to decrease, and at the same time, the processes during curing a paint are required to be drastically reduced to achieve the saving effect of foreign currency and the saving effect of energy due to the supply and demand of raw materials. Accordingly, the unit cost may be saved via the process efficiency and the cost reduction may be achieved via the optimization of air circulation.

Generally, a 2Coat1Bake (2C1B) vehicle painting system which is used as a novel painting system of a vehicle is a process including applying an electrodeposition paint to a vehicle body, applying a primer coating via a primer coating painting process, completely curing at 140 to 150° C. for 25 minutes, continuously applying a base coating and a clear coating thereon, and drying, and is the most generalized vehicle painting system. However, recently, vehicle manufacturers prefer the development of an eco-friendly and economic painting system, and in response, various painting systems are under development. For example, Korean Registration Patent No. 10-0484060 discloses "Low-temperature curable and high solid-type aqueous paint composition", relating to an aqueous paint composition having a high solid content and imparting a coated layer with high impact resistance, and discloses a system decreasing baking temperature and increasing a solid content, thereby saving process cost and energy. In addition, Korean Registration Patent No. 10-0665882 discloses "Aqueous multilayer painting system for vehicle", which is an eco-friendly painting technique minimizing the amount of volatile organic compounds by making primer coating and base coating parts water-soluble, and which is referred to as "Aqueous 3Coat1Bake (3C1B) painting system". This is a novel technique of a painting system which may lead very economic vehicle production by excluding a primer coating baking process (complete curing at 150° C. for 25 minutes), which is essentially necessary in a 2C1B painting system.

However, such system is not readily applicable to a solvent-borne painting facility system which is recently used by vehicle manufacturers, and there are limitations concerning new establishment of production facilities for an aqueous painting system and drastic replacement of existing facilities.

SUMMARY

The existing aqueous painting system is not applicable as it is to the conventionally used solvent-borne painting facility system, and new production facilities are required to be established, or most of the existing facilities are required to be replaced.

An aspect of the various embodiments is to provide an aqueous primer coating system which may be applicable as it is without changing an existing solvent-borne painting system and facilities.

According to at least one embodiment, there is provided a paint composition for a vehicle primer coating which includes 20 to 50 wt % of a polyester resin, 1 to 20 wt % of an acrylic resin, 1 to 15 wt % of a water-dispersed urethane resin, 1 to 15 wt % of a urethane resin, and 10 to 30 wt % of a melamine curing agent, based on a weight of the entire paint composition.

According to at least one embodiment, the polyester resin is a hydrophilic polyester resin having an acid value in a range of 20 to 50 mg KOH/g.

According to at least one embodiment, the acrylic resin is a hydrophilic acrylic resin having an acid value in a range of 40 to 100 mg KOH/g.

According to at least one embodiment, the water-dispersed urethane resin is a water-dispersed urethane resin having an acid value of 4 to 8 mg KOH/g, a particle size of 50 to 200 nm, and a number average molecular weight in a range of 20,000 to 50,000.

According to at least one embodiment, the urethane resin is a urethane resin having a hydroxyl value of 100 to 500 mg KOH/g and a number average molecular weight of 200 to 1,000.

According to at least one embodiment, there is provided a vehicle coating method which includes painting the paint composition according to various embodiments as a primer coating in a solvent-borne primer coating painting line.

According to at least one embodiment, the method further includes conducting a drying process at room temperature for 1 to 30 minutes after the applying.

The paint composition according to various embodiments may be applicable as it is without changing commonly and widely used solvent-borne painting technique and facilities, and since a solvent-borne primer coating paint is replaced with an aqueous primer coating paint, the paint composition is eco-friendly and economic. In addition, the paint composition according to various embodiments has improving effects of all sorts of the physical properties of a coated layer such as the hardness of a coated layer, removal of popping and pinhole, storage stability, the fast drying of a primer coating, ultraviolet blocking effect, workability, adhesiveness, water resistance, impact resistance, stone chip resistance, and the prevention of interlayer mixing. In addition, the painting of a base coating and a clear coating may be possible without a flash-off process which is a process for removing moisture after painting and before performing a baking process, and so it is economical.

DETAILED DESCRIPTION

Embodiments provide a paint composition for a vehicle primer coating including 20 to 50 wt % of a polyester resin, 1 to 20 wt % of an acrylic resin, 1 to 15 wt % of a water-dispersed urethane resin, 1 to 15 wt % of a urethane resin, and 10 to 30 wt % of a melamine curing agent, based on a weight of the entire paint composition.

The aqueous paint composition for a vehicle primer coating according to at least one embodiment is a paint composition for a primer coating, which may be used in a painting system (2C1B painting system) for a vehicle and may include a polyester resin, an acrylic resin, a water-dispersed urethane resin, a urethane resin, a melamine curing agent and other additives, and thus, may provide sufficient appearance and physical properties of a vehicle with drying at room temperature (about 10 minutes) only without a flash-off process (at 80° C. for 5 minutes), which is one of the conventional aqueous processes.

The polyester resin is the main resin of the paint composition according to at least one embodiment, which imparts the flexibility, gloss and durability of a coated layer, and may be prepared by synthesizing a polybasic acid and polyhydric alcohol to achieve excellent adhesiveness with an electrodeposited coating and with a base coating. Preferably, the polyester resin may be a hydrophilic polyester resin which is synthesized using 1,6-hexanediol and adipic acid as basic structures and has an acid value in a range of 20 to 50 mg KOH/g, but may not be limited thereto.

According to at least one embodiment, the polyester resin may be included in an amount of 20 to 50 wt % based on the weight of the entire paint composition. If the amount of the polyester resin is less than 20 wt % or greater than 50 wt %, the mechanical/chemical properties of the paint may be deteriorated.

According to at least one embodiment, the acrylic resin may be prepared by mixing two or more kinds of acrylic monomers to impart the dispersion stability of a pigment and storage stability, and may preferably be a hydrophilic acrylic resin which is synthesized using butyl acrylate and methyl methacrylate as basic structures and has an acid value in a range of 40 to 100 mg KOH/g, but may not be limited thereto.

According to at least one embodiment, the acrylic resin may be included in an amount of 1 to 20 wt %, 3 to 10 wt % based on the weight of the entire paint composition. If the amount of the acrylic resin is less than 1 wt %, the appearance may be deteriorated, and if the amount is greater than 20 wt %, the physical properties of the paint may be deteriorated.

According to at least one embodiment, the water-dispersed urethane resin is used for improving the flexibility and chipping resistance of a coated layer and may be a water-dispersed urethane resin having a number average molecular weight of 20,000 to 50,000, and acid value of 4 to 8 mg KOH/g and a particle size of 50 to 200 μm, which is synthesized using dimethylpropionic acid, a polycarbonate polyol having a number average molecular weight of 500 to 4,000 and 4,4'-methylene dicyclohexyl diisocyanate, but may not be limited thereto.

If the number average molecular weight of the water-dispersed urethane resin is less than 20,000, chipping resistance are degraded, and if the number average molecular weight is greater than 50,000, atomization during spray work may be degraded.

According to at least one embodiment, the water-dispersed urethane resin may be included in an amount of 1 to 15 wt % based on the weight of the entire paint composition. If the amount of the water-dispersed urethane resin is less than 1 wt %, elasticity may be degraded and chipping resistance may be decreased, and if the amount is greater than 15 wt %, the physical properties of the entire paint may be deteriorated due to the small amount of the solid content.

According to at least one embodiment, the urethane resin is used to impart flexibility during drying at room temperature and an initial curing step to show excellent appearance and may be a urethane resin having a number average molecular weight of 200 to 1,000 and a hydroxyl value in a range of 100 to 500 mg KOH/g, which is synthesized using propylene carbonate, dimethyl carbonate and ethylene carbonate with diamines such as dimethyl pentane amine, but may not be limited thereto.

If the number average molecular weight of the urethane resin is less than 200, water resistance may be degraded, and if the number average molecular weight is greater than 1,000, appearance may be degraded.

If the hydroxyl value of the urethane resin is less than 100 mg KOH/g, water dispersion stability may be degraded, and if the hydroxyl value is greater than 500 mg KOH/g, hardness may be degraded.

According to at least one embodiment, the urethane resin may be included in an amount of 1 to 15 wt %, 3 to 10 wt % based on the weight of the entire paint composition. If the amount of the urethane resin is less than 1 wt %, appearance may be degraded, and if the amount is greater than 15 wt %, gloss may be degraded.

According to at least one embodiment, the melamine curing agent may be included as a curing agent for improving the adhesiveness and hardness of the paint composition of at least one embodiment and the mechanical properties of a coated layer. Particularly, a methylated melamine resin may react with a hydroxyl group in a base paint which is applied on the primer coating and may play the role of improving the density and hardness of a coated layer. The methylated melamine resin is a common melamine resin having a methyl group and is used in an amount of 10 to 30 wt % based on the weight of the entire paint composition to improve the density and plasticity of a coated layer. If the amount is less than 10 wt %, the improving effect of the aforementioned physical properties is hard to be expected, and if the amount is greater than 30 wt %, heat storage properties may become an issue.

The aqueous paint composition for a vehicle primer coating according to at least one embodiment may further include one or more selected from the group consisting of a pigment, a rheology modifier, a ultraviolet absorber, fine titanium dioxide, a dispersing agent, a defoaming agent, an anti-settling agent, a pH modifier, a wetting agent, a solvent and a combination thereof, but may not be limited thereto.

According to at least one embodiment, the additive such as a pigment may include a ultraviolet absorber and fine titanium dioxide for preventing ultraviolet rays which may reach an electrodeposition surface. In a 2C1B system, a part of ultraviolet rays, which has passed through a clear coating and a base coating, is mostly absorbed by a primer coating part so that ultraviolet rays do not reach the electrodeposition surface. Particularly, since the aqueous primer coating, which is applied to a 2C1B system, is required to be completely cured at 150° C. for 25 minutes and have a coated layer thickness of about 40 µm degree, the ultraviolet rays may be appropriately blocked. However, in case of the incomplete curing of a paint without a flash-off process, the quality of gloss and appearance may be degraded, and thus, the ultraviolet absorber may be used. In addition, the fine titanium dioxide has an average size of about 20 nm, and may effectively diffuse ultraviolet rays. Accordingly, when the fine titanium dioxide is used together with the ultraviolet absorber, efficient ultraviolet blocking effect may be achieved.

According to at least one embodiment, the ultraviolet absorber may have the solid content of about 90 wt % and may be included in an amount of about 0.1 to 1 wt % based on the entire paint composition, but may not be limited thereto. If the ultraviolet absorber is included in an amount less than the aforementioned range, ultraviolet absorbing capability may be degraded, and if the amount is greater than the aforementioned range, the ultraviolet absorber may float up to a base coating and a clear coating to provide turbid appearance overall.

According to at least one embodiment, the fine titanium dioxide may have the solid content of 100 wt % and may be included in an amount of about 0.1 to 3 wt % based on the entire paint composition, but may not be limited thereto. If the fine titanium dioxide is used in an amount less than the aforementioned range, ultraviolet absorbing capability may be degraded, and if the amount is greater than the aforementioned range, concealing may become an issue.

According to at least one embodiment, the dispersing agent may be DISPERBYK-180 and DISPERBYK-199 of BYK-Chemie GmbH, and these may be used alone or as a mixture thereof, but may not be limited thereto. If the dispersing agent is included in an amount of 0.5 wt % or less, the dispersing efficiency of a pigment may be largely deteriorated and the re-aggregation phenomenon of the pigment may be easily induced, and when the re-aggregated paint is applied cratering, defect of abrasion resistance and gloss reduction may be generated in a coated layer. If the dispersing agent is included in an amount of 3.0 wt % or more, transparency may be excessively increased, the concealing property of a coated layer may be degraded, cost may increase, and ionic groups may increase in a coated layer to markedly degrade the water resistance of a coated layer.

In the paint composition according to at least one embodiment, most of the solvent is composed of water, so the foaming during forming a mill base or finishing may become major issues and popping phenomenon during forming a coated layer may be significantly induced. Accordingly, in order to solve such problems, a non-silicon-based defoaming agent is used in a mill-base step or a finishing step. The amount used of the defoaming agent may be about 0.1 to 2.0 wt % based on the entire aqueous paint composition. For example, BYK-011, BYK-015, etc. of BYK-Chemie GmbH may be used, but may not be limited thereto.

Generally, an aqueous paint is relatively slowly dried, and flowability in a vertical part may be bad and sagging, etc., may be easily induced. In order to prevent these phenomena, a rheology modifier may be used. As the rheology modifier of this paint, an alkali swellable thickener may be used, but may not be limited thereto. The alkali swellable thickener may use Solthix A100 of Lubrizol Corporation, SN-Thickener 641 of San nopco Ltd., etc., as an acrylic copolymer emulsion type, but may not be limited thereto. The amount used of the rheology modifier may be about 0.1 to 3 wt %, but may not be limited thereto. If the amount deviates from this range, the flowability of a paint may become bad and sagging phenomenon may be generated.

According to at least one embodiment, the paint composition may additionally use components used in the art via mixing in addition to the aforementioned components. For example, commonly used components for preparing a paint composition such as a surfactant, a dispersing agent, a defoaming agent, an anti settling agent, a pH modifier, a wetting agent and a solvent may be used in commonly applied amounts.

According to at least one embodiment, the paint composition may be appropriately used as a paint for a primer coating in a solvent-borne 2C1B painting system. That is, the paint composition may be applied in solvent-borne painting system facilities through painting thereof as a primer coating, curing thereof, and painting a base coating and a clear coating in a painting line.

As the solvent used in the paint composition according to at least one embodiment, solvents having a high boiling point such as butyl glycol and butyl carbitol, and solvents having a low boiling point such as n-propyl alcohol may be used alone or as a mixture thereof. The solvent may largely improve the planarity of a coated layer, lower the minimum formation temperature of a coated layer, improve the spray atomization during painting, and facilitate the volatilization of water. In addition, since the solvent is highly miscible with water, and water-dispersed and aqueous resins, the viscosity decrease of the paint may be largely affected. The amount of a co-solvent used in the various embodiments may be about 1 to 5 wt % with respect to the entire aqueous paint composition, but may not be limited thereto.

According to at least one embodiment, a coloring pigment may be added to the aqueous paint composition which is prepared by using the water-dispersed and aqueous resins so as to easily attain aqueousness and provide beautiful color, and a spherical extender pigment may be added for protecting a paint layer to impart strong properties and to increase the thickness of the paint layer, thereby enhancing planarity. The pigments are required to be polished to an atomized size of 5 μm or less via dispersing or milling. Since most of the solvent of the aqueous paint is composed of water, the evaporation rate thereof is very slow. Thus, the milling is conducted to increase the total surface area of the pigments and increase the evaporation rate of water. The pigment used may include an inorganic coloring pigment such as titanium dioxide and an extender pigment such as barium sulfate, and may be used in an amount of about 25 to 35 wt %, but may not be limited thereto. If the amount of the pigment used is less than 25 wt %, concealing property may be degraded, and if the amount is greater than 35 wt %, interlayer adhesiveness between coated layers, gloss and color clearance may be degraded, mechanical properties may be degraded, and that would be a factor of increasing the cost of a paint.

According to at least one embodiment, there is further provided a vehicle coating method, including painting the paint composition according to at least one embodiment, as a primer coating in a solvent-borne primer coating painting line.

According to at least one embodiment, the vehicle coating method may further conduct a drying process, a curing process, or a drying and curing process after painting the paint composition according to at least one embodiment as a primer coating, but may not be limited thereto.

In the vehicle coating method according to at least one embodiment, the drying process may be conducted at room temperature for 1 to 30 minutes, but may not be limited thereto. In addition, the drying process may be conducted at room temperature for about 10 minutes. The curing process may be conducted at about 140 to 150° C. for about 25 minutes.

As described above, by a curing process after conducting drying at room temperature for 10 minutes without complementing or replacing the conventional solvent-borne painting system, solvent-borne painting facilities which correspond to a painting system without flash-off process facilities may be used as they are, thereby achieving economic profits on the costs for establishment and processing cost.

In addition, by mixing the urethane resin having a number average molecular weight of 200 to 1,000, proper rheological properties may be attained during drying at room temperature and an initial curing process, and excellent appearance may be obtained.

That is, by using the aqueous paint composition for a primer coating according to at least one embodiment, a curing process may be conducted after drying at room temperature for 10 minutes without complementing or replacing the conventional solvent-borne painting system and solvent-borne painting facilities which correspond to a painting system without intermediate flash-off process facilities may be used as they are, and thus, economic profits on costs for establishment and processing may be attained. In addition, the process cost of an aqueous painting system may be decreased through serving rapid drying by improving the limitations of an aqueous primer coating system which serves relatively slow drying. In addition, a paint which improves defects of physical properties such as appearance and chipping resistance, which may be generated in a solvent-borne primer coating drying system, may be provided. Also, there are merits of using a solvent-borne primer coating drying system and providing a paint having similar or equal physical properties and appearance as a solvent-borne primer coating paint.

Hereinafter, the various embodiments will be explained in more detail. However, the various embodiments are only to assist the understanding of the invention and the scope of the various embodiments is not limited thereto in any sense.

EXAMPLES

Various embodiments were conducted using each of the components illustrated below unless otherwise particularly mentioned.

Polyester resin: a hydrophilic polyester resin having an acid value in a range of 20 to 50 mg KOH/g (KCC Corporation, prepared in person)

Acrylic resin: a hydrophilic acrylic resin having an acid value in a range of 40 to 100 mg KOH/g (KCC Corporation, prepared in person)

Water-dispersed urethane resin: a water-dispersed urethane resin having a number average molecular weight of 20,000 to 50,000, an acid value of 4 to 8 mg KOH/g, and a particle size of 50 to 200 nm (KCC Corporation, prepared in person)

Urethane resin 1: a urethane resin having a number average molecular weight of 200 to 1,000, and a hydroxyl value in a range of 100 to 500 mg KOH/g (KCC Corporation, prepared in person)

Urethane resin 2: a urethane resin having a number average molecular weight of 1,500 to 3,000, and a hydroxyl value in a range of 100 to 500 mg KOH/g (KCC Corporation, prepared in person)

Melamine curing agent: a common melamine resin including a methyl group (Cymel 303, Cymel 325, Cymel 327, etc. of ALLNEX Corporation and LUWIPAL 052, 062 and 072 of BASF Corporation)

Rheology modifier: an alkali swellable thickener (Solthix A100 of Lubrizol Corporation, and SN-Thickener 641 of San nopco Ltd.)

Pigment: commonly applied organic and inorganic pigments (titanium dioxide, carbon black and barium sulfate)

Ultraviolet absorber: an absorber having the structure of benzotriazole series (Tinuvin 384-2 of Ciba Inc.)

Fine titanium dioxide: titanium dioxide having an average particle size of 20 nm or less (UV-TITAN L181 of Kemira Chemicals, Inc.)

Co-solvent: a mixture solvent of butyl glycol, butyl carbitol and n-propyl alcohol Defoaming agent: a non-silicon-based defoaming agent (BYK-011 of BYK-Chemie GmbH)

Dispersing agent: DISPERBYK-180 of BYK-Chemie GmbH

1. Composition of an Aqueous Paint for Vehicle Primer Coating

According to the composition shown in Table 1 below, paint compositions of Examples 1 and 2 and Comparative Examples 1 to 5 were prepared. Examples 1 and 2 corresponded to paint compositions prepared according to the composition of at least one embodiment, Comparative Examples 1 and 2 corresponded to solvent-borne paint compositions not including an acrylic resin and a water-dispersed urethane resin, and Comparative Examples 3 and 4 corresponded to solvent-borne paint compositions including a water-dispersed urethane resin but not including a urethane resin. Comparative Example 5 corresponded to a paint composition prepared according to the composition of at least one embodiment except that the number average molecular weight of the urethane resin used was 2,000.

TABLE 1

| | Example (unit g) | | Comparative example (unit g) | | | | |
|---|---|---|---|---|---|---|---|
| | 1 | 2 | 1 | 2 | 3 | 4 | 5 |
| Polyester resin | 25 | 30 | 16.1 | 20 | 25 | 30 | 25 |
| Acrylic resin | 5 | 5 | — | — | 10 | 5 | 5 |
| Water-dispersed urethane resin | 5 | 3 | — | — | 3 | 3 | 5 |
| Urethane resin 1 | 8 | 5 | 20 | 16.1 | — | — | |
| Urethane resin 2 | | | | | | | 8 |
| Melamine curing agent | 17 | 17 | 25 | 25 | 17 | 17 | 17 |
| (Co)solvent | 3 | 3 | 15 | 15 | 3 | 3 | 3 |
| Rheology modifier | 1.1 | 1.1 | 1.1 | 1.1 | 1.1 | 1.1 | 1.1 |
| Titanium dioxide | 11 | 11 | 10 | 10 | 11 | 11 | 11 |
| Barium sulfate | 12 | 12 | 10 | 10 | 12 | 12 | 12 |
| Fine titanium dioxide | 2 | 2 | 2 | 2 | 2 | 2 | 2 |
| Black pigment (carbon black) | 0.1 | 0.1 | 0.1 | 0.1 | 0.1 | 0.1 | 0.1 |
| Dispersing agent | 0.6 | 0.6 | 0.6 | 0.6 | 0.6 | 0.6 | 0.6 |
| Defoaming agent | 0.1 | 0.1 | 0.1 | 0.1 | 0.1 | 0.1 | 0.1 |
| Ultraviolet absorber | 0.1 | 0.1 | — | — | 0.1 | 0.1 | 0.1 |
| Water | 10 | 10 | — | — | 15 | 15 | 10 |

2. Evaluation of Physical Properties of Aqueous Paint for Vehicle Primer Coating Physical properties such as the viscosity, dispersion stability, storage property at room temperature, heat storage property, primer coating gloss, final appearance, primer coating drying property, adhesiveness, impact resistance, water resistance, water resistant adhesiveness, stone chip resistance, workability of painting apparatus, primer coating flowability and primer coating planarity of the paint compositions of Examples 1 and 2 and Comparative Examples 1 to 5 were evaluated.

Criteria for evaluating the physical properties of a paint composition are as follows:

Viscosity: a viscosity in accordance with time is measured using Ford cup #4 (mainly used in a range of 40 to 60 seconds for an aqueous paint, and used in a range of 20 to 30 seconds for a solvent-borne paint. Within the ranges, vertical part flowability is required to be good and sagging is required be unobserved)

Dispersion Stability: a dispersion particle size is measured using a Hegmann gauge (dispersion stability of an aqueous paint is considered as being maximum 5 μm or less)

Primer coating gloss: a reflection value is measured using a glossmeter (Glossmeter 60')

Final appearance: a final CF value is measured by applying Wave Scan DOI (BYK Gardener), which is a measurement apparatus of vehicle appearance (the CF level of a recently applied solvent-type 2C1B silver metallic painting system is 55 level, and the higher, the better)

Adhesiveness: after manufacturing 100 numbers of 1 mm cross-cuts, a scotch tape is attached thereto and then detached therefrom, and adhesiveness is judged as good when no defects are observed (judged as excellent when nothing is separated from the cross-cut part of a knife edge)

Impact resistance: a spherical pendulum with 500 g is fallen from a height of 40 cm or more, and if there are no cracks and exfoliation phenomenon, it is judged as excellent Water resistant adhesiveness: after immersing in water and standing at room temperature for 1 day, adhesiveness is evaluated (judged by the same method as adhesiveness)

Stone chip resistance: after standing at −40° C. for 3 hours, a method of striking the surface of a coated layer by pushing a chipping stone with 50 g using a pressure of 4 bars is used (judged as excellent when damages with a size of 1 mm or less are 10 or less, good when damages with a size of 1 to 2 mm are 10 or less, and common when damages with a size of 2 to 3 mm are 10 or less)

Primer coating flowability: a flowing degree of a painted surface after painting a vertical side part is evaluated.

Primer coating drying property: after drying at 80 degrees for 3 minutes, sticky degree is evaluated when set to touch measurement.

Storage property at room temperature: to evaluate the stability of a paint, after standing at 25° C. for 7 days, the viscosity change of a paint is checked. The viscosity is required not to exceed twice that before test.

Heat storage property: to evaluate the stability of a paint, after standing at 43° C. for 7 days, the viscosity change of a paint is checked. The viscosity is required not to exceed twice that before test.

Water resistance: a painted specimen is immersed in a thermostat water bath at 40° C. for 240 hours and stood at room temperature for 1 hour, and exfoliation test is conducted by adhesiveness evaluation using checkerboard-shape squares to check the appearance with a naked eye. After the test, softening, whitening, gloss defects, peeling, swelling, discoloration, etc. are required to be unobserved by appearance, appearance difference between an immersed part and a non-immersed part is required to be unobserved, and M-2.5 degree or more is required to be obtained by adhesiveness test.

Primer coating planarity: the planarity degree of a coated surface is evaluated after painting a vertical side part.

Workability of painting apparatus: during painting by means of an air spray or a bell-type painter, atomization is required to be performed well, and uniform and planar coated layer is required to be formed.

On a specimen on which an electrodeposited paint was coated, each of the paint compositions for a primer coating according to Examples 1 and 2 and Comparative Examples 1 to 5 was applied, dried at room temperature for 10 minutes and cured at 150° C. for 25 minutes. Then, a base coating and a clear coating were applied to form a final coated layer. For the primer coating coated layer and the final coated layer, tests were conducted under the test methods and conditions of Table 2, and the results are shown below.

TABLE 2

| | Example | | Comparative Example | | | | |
|---|---|---|---|---|---|---|---|
| Test criteria | 1 | 2 | 1 | 2 | 3 | 4 | 5 |
| Viscosity | ○ | ○ | ○ | ○ | ○ | ○ | ○ |
| Dispersion stability | ○ | ○ | ○ | ○ | ○ | ○ | ○ |
| Storage property at room temperature | ○ | ○ | ○ | ○ | ○ | ○ | ○ |
| Heat storage property | ○ | ○ | Δ | ○ | ○ | ○ | ○ |
| Primer coating gloss | 81 | 82 | 86 | 85 | 82 | 83 | 68 |
| Final appearance | 63.5 | 62.0 | 59.4 | 58.1 | 60.0 | 59.1 | 59.4 |
| Primer coating drying property | ◎ | ◎ | ◎ | ◎ | ◎ | ◎ | ◎ |
| Adhesiveness | ○ | ○ | ○ | ○ | ○ | ○ | ○ |
| Impact resistance | ○ | ○ | ○ | ○ | ○ | ○ | ○ |
| Water resistance | ○ | ○ | ○ | ○ | ○ | ○ | ○ |
| Water resistant adhesiveness | ○ | ○ | ○ | ○ | ○ | ○ | ○ |
| Stone chip resistance | ○ | ○ | ○ | ○ | ○ | ○ | ○ |
| Workability of painting apparatus | ○ | ○ | ○ | ○ | ○ | ○ | ○ |
| Primer coating flowability | ○ | ○ | ○ | ○ | ○ | ○ | ○ |
| Primer coating planarity | ◎ | ◎ | ○ | ○ | ○ | ○ | ○ |

Evaluation: ◎ excellent, ○ good, Δ common, X bad

In case of using an aqueous paint for a primer coating in a solvent-borne primer coating system, the most important part is the increase of the drying property of a primer coating. With the thickness of a coated layer of about 30 µm, the drying property of a resin is very important to increase the drying. It was found that the resins applied in Examples 1 and 2 were prepared to have rapid drying property when compared to the conventional solvent-borne resin, and the appearance of a coated layer was different according to the ratio of the resin.

The same composition as in Example 1 was applied to conduct the tests except that in Comparative Examples 1 and 2, the conventional solvent-borne primer coating system was applied, in Comparative Examples 3 and 4, the conventional aqueous primer coating system was applied, and in Comparative Example 5, a urethane resin having a number average molecular weight of 2,000 was used.

In case of comparing Examples 1 and 2 with Comparative Examples 1 and 2 (solvent-borne primer coating system), similar performance including all physical properties and workability was shown under the same painting conditions, but the paint compositions of Examples 1 and 2 showed improved results in final appearance by 2.6 to 5.4 points. When comparing Examples 1 and 2 with Comparative Examples 3 and 4 (aqueous primer coating system), equivalent degrees of physical properties and workability were shown, while the paint compositions of Examples 1 and 2 showed improved results in final appearance by 2.0 to 4.4 points. In case of Comparative Example 5 in which a urethane resin having a number average molecular weight of 2,000 was applied, compatibility was decreased according to the increase of a molecular weight, and gloss and appearance deterioration phenomena were shown when compared to Example 1.

Accordingly, the aqueous paint composition for a vehicle primer coating according to the composition of at least one embodiment includes a urethane resin having a number average molecular weight in a range of 200 to 1,000 had rapid drying property and was economical when compared to the conventional primer coating composition, and had equivalent degree of physical properties and workability together with excellent final appearance when compared to the conventional primer coating composition. In addition, it was secured that better physical properties were attained when compared to a primer coating composition of a comparative example which used a urethane resin having a number average molecular weight deviated from that of the urethane resin used in the various embodiments.

The invention claimed is:

1. An aqueous paint composition for vehicle primer coating, comprising:
    20 to 50 wt % of a polyester resin;
    1 to 20 wt % of an acrylic resin;
    1 to 15 wt % of a water-dispersed urethane resin;
    1 to 15 wt % of a urethane resin; and
    10 to 30 wt % of a melamine curing agent, based on the weight of the entire paint composition,
    wherein the urethane resin is a urethane oligomer having a number average molecular weight of 200 to 1,000, having a hydroxyl value of 100 to 500 mg KOH/g, and being synthesized from propylene carbonate, dimethyl carbonate, ethylene carbonate and diamines.

2. The aqueous paint composition for vehicle primer coating of claim 1, wherein the polyester resin is a hydrophilic polyester resin having an acid value in a range of 20 to 50 mg KOH/g.

3. The aqueous paint composition for vehicle primer coating of claim 1, wherein the acrylic resin is a hydrophilic acrylic resin having an acid value in a range of 40 to 100 mg KOH/g.

4. The aqueous paint composition for vehicle primer coating of claim 1, wherein the water-dispersed urethane resin is a water-dispersed urethane resin having an acid value of 4 to 8 mg KOH/g, a particle size of 50 to 200 nm, and a number average molecular weight in a range of 20,000 to 50,000.

5. A vehicle coating method, comprising applying the aqueous paint composition of claim 1 as a primer coating in a solvent-borne primer coating painting line.

6. The vehicle coating method of claim 5, comprising conducting a drying process at room temperature for 1 to 30 minutes after the applying.

7. The vehicle coating method of claim 6, comprising conducting a curing process at a temperature of 140 to 150° C. for at least 25 minutes after the drying process.

8. The vehicle coating method of claim 6, wherein the method excludes any solvent-borne painting system.

9. The aqueous paint composition for vehicle primer coating of claim 1, wherein the polyester resin comprises a hydrophilic polyester resin that is synthesized using 1,6-hexanediol and adipic acid.

10. The aqueous paint composition for vehicle primer coating of claim 1, wherein the acrylic resin comprises a hydrophilic acrylic resin which is synthesized using butyl acrylate and methyl methacrylate.

11. The aqueous paint composition for vehicle primer coating of claim 1, wherein the water-dispersed urethane resin comprises a resin synthesized using dimethylpropionic acid, a polycarbonate polyol, and 4,4'-methylene dicyclohexyl diisocyanate.

12. The aqueous paint composition for vehicle primer coating of claim 11, wherein the polycarbonate polyol has a number average molecular weight of 500 to 4,000.

13. The aqueous paint composition for vehicle primer coating of claim 1, wherein the melamine curing agent comprises a melamine resin having a methyl group.

14. The aqueous paint composition for vehicle primer coating of claim 1, wherein the diamines comprises dimethyl pentane amine.

15. The aqueous paint composition for vehicle primer coating of claim 1, comprising 3 to 10 wt % of a urethane resin.

16. The aqueous paint composition for vehicle primer coating of claim 1, further comprising a coloring pigment.

17. The aqueous paint composition for vehicle primer coating of claim 16, wherein the coloring pigment has an atomized size of 5 µm or less.

* * * * *